US005168124A

United States Patent [19]

Takase et al.

[11] Patent Number: 5,168,124

[45] Date of Patent: Dec. 1, 1992

[54] WATERPROOF SEAL CONSTRUCTION FOR WIRE HARNESS

[75] Inventors: Hiraji Takase; Toshio Iizuka, both of Shizuoka, Japan

[73] Assignee: Yazaki Corporation, Tokyo, Japan

[21] Appl. No.: 670,837

[22] Filed: Mar. 18, 1991

[30] Foreign Application Priority Data

Mar. 28, 1990 [JP] Japan .................................... 2-76748

[51] Int. Cl.[5] ............................................ H02G 15/25

[52] U.S. Cl. ................................ 174/23 R; 174/72 A

[58] Field of Search ................. 174/23 R, 23 C, 22 R, 174/22 C, 72 A

[56] References Cited

U.S. PATENT DOCUMENTS 3,321,558 5/1967 Balamuth et al. ................ 174/22 R
3,340,112 9/1967 Davis et al. ........................... 156/47
3,347,974 10/1967 Arendt et al. .................... 174/23 R
3,839,596 10/1974 Glover .............................. 174/23 R
4,017,772 4/1977 Burnside ......................... 174/72 A X
4,461,736 7/1984 Takagi ............................ 174/23 R X
4,793,877 12/1988 Mineur ............................. 174/23 R
4,961,961 10/1990 Vincent et al. .............. 174/23 C X

FOREIGN PATENT DOCUMENTS 61-107165 7/1986 Japan .
62-222515 9/1987 Japan .
1-59467 12/1989 Japan .

*Primary Examiner*—Morris H. Nimmo
*Attorney, Agent, or Firm*—Sughrue, Mion, Zinn, Macpeak & Seas

[57] ABSTRACT

A waterproof seal constitution for a wire harness comprises, a plurality of electrically insulatively-covered wires connected together at a branch connecting portion; a waterproof connecter connected to an end of the electrically insulatively-covered wire; and a closure portion for closing gaps between the conductors with the wire.

6 Claims, 2 Drawing Sheets

W'
1
1'
2
3
9
41
42
43
2
1a
1b
1b'
10
3

WATERPROOF SEAL CONSTRUCTION FOR WIRE HARNESS

BACKGROUND OF THE INVENTION

This invention relates to a waterproof seal construction for a wire harness having a branch connecting portion intermediate opposite ends thereof and having waterproof connectors connected respectively to the opposite ends thereof.

In the type of wire harness (automotive wiring) in which a waterproof connector and a branch connection are used, when water enters a wire due to an incomplete waterproof treatment, the water intrudes into the waterproof connector because of a suction phenomenon due to a temperature difference of the waterproof connector. As a result, the overall waterproof effect of the wire harness is lowered.

FIG. 7 shows one example of wire harness of such a construction. The wire harness W comprises an electrically insulatively-covered wire 1, and the covering or sheath is removed from the wire 1 intermediate the opposite ends thereof to expose conductors 1*a*. Another wire 1' is branch-connected to the thus exposed portion of the conductors 1*a* by the use of a crimp-style terminal 2. A waterproof seal 3 is provided on this branch connecting portion either by winding a tape, such as a PVC tape and a butyl rubber tape, on this branch connecting portion or by applying a molding of PVC to this branch connecting portion. A waterproof connector $4_1$ of the female type is connected to one end of the wire 1. A male terminal 7 press-connected to the end of the wire 1 is inserted in a terminal receiving chamber 6 of a connector housing 5, and a rubber plug 8 fitted on the wire end portion is fitted in the receiving chamber 6. The waterproof connector $4_1$ is fitted on a waterproof connector 4' of the male type through a packing (not shown). Similarly, waterproof connectors $4_2$ and $4_3$ of the female type are connected to the other end of the wire 1 and the end of the wire 1', respectively. These ends of the wires 1 and 1' may be connected to one waterproof connector $4_2$ or $4_3$.

As will be appreciated from FIG. 7, if the branch connecting portion where the waterproof seal 3 is provided is defective, the water intruding into the wire harness from this portion would cause corrosion of the contact between the female and male terminals of the waterproof connectors $4_1$ and $4_2$ and $4_3$ and also corrosion of that portion press-clamped to the wire. Further, this adversely affects the electrical insulation between the adjacent terminals.

SUMMARY OF THE INVENTION

It is an object of this invention to provide a waterproof seal construction for a wire harness having a branch connecting portion and waterproof connectors, in which even if a waterproof treatment of the branch connecting portion is incomplete, the intrusion of water into the waterproof connectors is eliminated, thereby preventing the increase of the resistivity of the contact portion, an imperfect electrical conductivity, and a short-circuiting between the terminals.

According to the present invention, there is provided a waterproof seal construction for a wire harness including a plurality of electrically insulatively-covered wires connected together at a branch connecting portion, and a waterproof connector connected to an end of said electrically insulatively-covered wire; characterized in that intermediate said branch connecting portion and said waterproof connector, a portion of an electrically-insulative covering of said electrically insulatively-covered wire to which said waterproof connector is connected is fused to be filled in gaps between conductors within said wire to form a closure portion closing the gaps between said conductors.

Preferably, a protective layer is provided on the outer periphery of the fused-and-solidified portion of the electrically-insulative covering constituting the closure portion.

According to another aspect of the invention, there is provided a waterproof seal construction for a wire harness including a plurality of electrically insulatively-covered wires connected together at a branch connecting portion, and a waterproof connector connected to an end of said electrically insulatively-covered wire; characterized in that intermediate said branch connecting portion and said waterproof connector, a synthetic resin tube is fused to a portion of an electrically-insulative covering of said electrically insulatively-covered wire to which said waterproof connector is connected, and at the same time said portion of said electrically-insulative covering is fused to be filled in gaps between conductors within said wire to form a closure portion closing the gaps between said conductors.

With this construction, even if the branch connecting portion of the wire harness has an imperfect waterproof treatment, the closure portion closing the gaps between the conductors so as to prevent the intrusion of water is formed intermediate the branch connecting portion and the waterproof connector. Therefore, the increase of the resistivity of the contact portion, an imperfect electrical conductivity, and a short-circuiting between the terminals within the waterproof connector are prevented, thus providing the wire harness of a high electrical reliability.

Part of the electrically-insulative covering is thinned as a result of the formation of the closure portion; however, this thinned portion is reinforced by providing the protective layer on the outer periphery of the thinned portion, or by fusing the synthetic resin tube to the outer periphery of the thinned portion simultaneously with the formation of the closure portion.

DESCRIPTION OF THE PREFERRED EMBODIMENTS

The invention will now be described with reference to the drawings.

Figures 1, 2, 3:
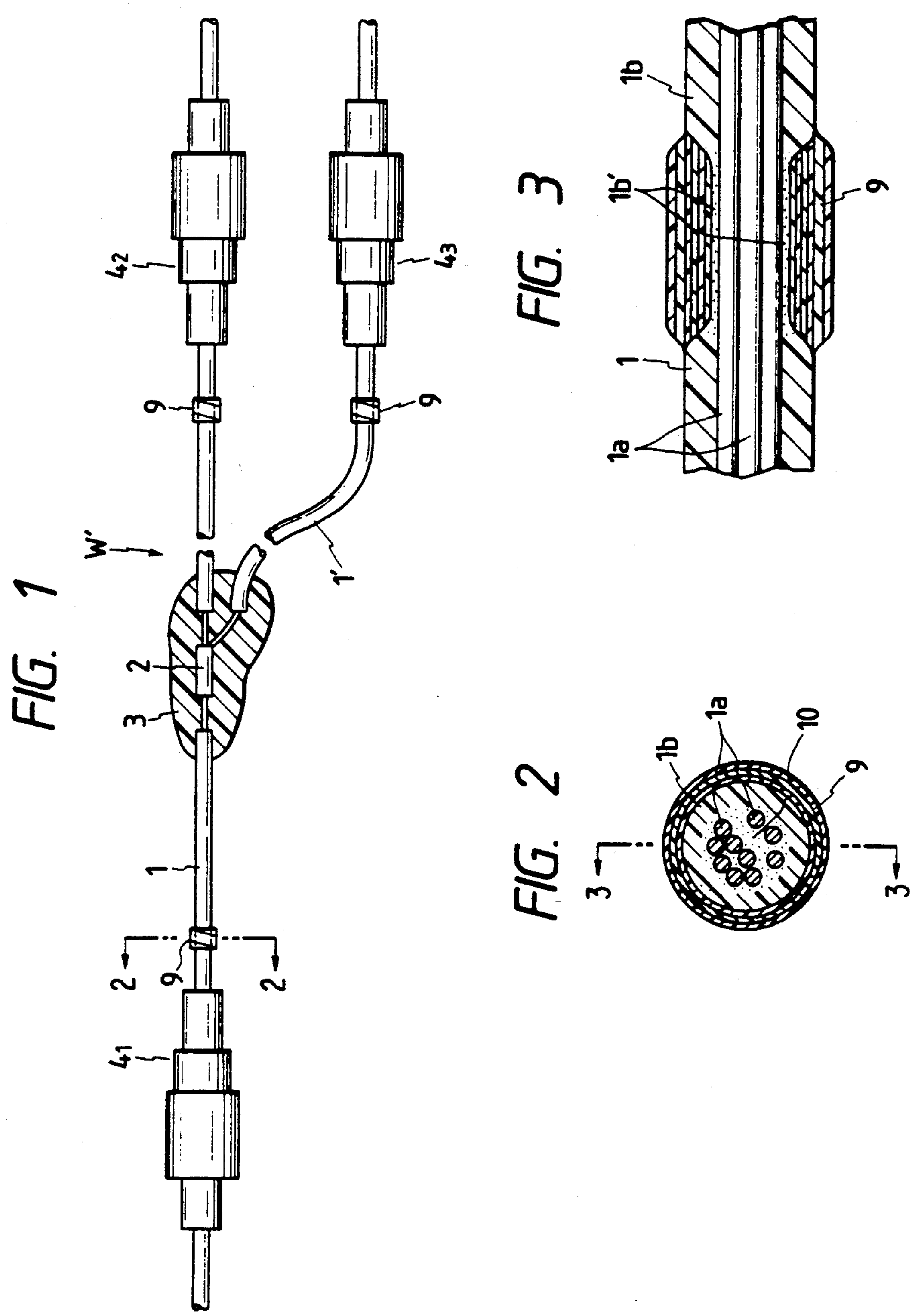
FIG. 1 is a partly-broken, plan view of a preferred embodiment of a wire harness of the present invention.
FIG. 2 is an enlarged cross-sectional view taken along the line II—II of FIG. 1.
FIG. 3 is a fragmentary cross-sectional view taken along the line III—III of FIG. 2.

FIG. 1 is a partly-broken, plan view of a preferred embodiment of a wire harness of the present invention.

FIG. 2 is an enlarged cross-sectional view taken along the line II—II of FIG. 1. FIG. 3 is a fragmentary cross-sectional view taken along the line III—III of FIG. 2. Those portions of this embodiment identical to those of the above prior art are designated by identical reference numerals, respectively.

Figure 7:
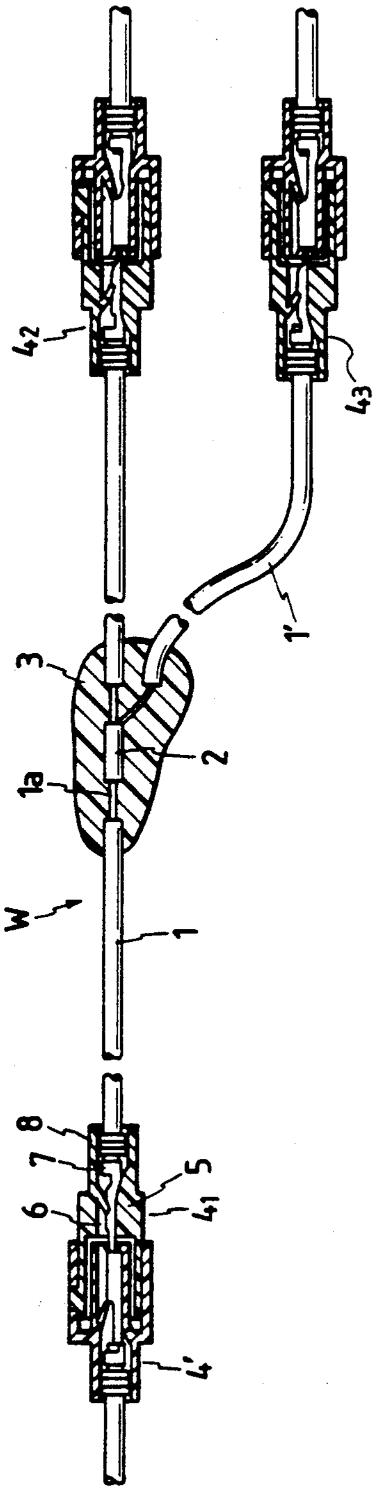
FIG. 7 PRIOR ART
FIG. 7 is a view illustrative of a conventional wire harness.

In these Figures, a wire 1' is branch-connected to an intermediate portion of an electrically insulatively-covered wire 1 (which constitutes a wire harness W') by a crimp-style terminal 2. A waterproof seal 3 is provided on this connecting portion, and waterproof connectors $4_1$, $4_2$ and $4_3$ are connected to the opposite ends of the wire 1 and the end of the wire 1'. This construction is similar to that shown in FIG. 7.

In the present invention, a portion of an electrically-insulative covering or sheath **1*b* of the wire 1 (1') is melted or fused between the above branch connecting portion (where the waterproof seal 3 is provided) and the waterproof connector $4_1$($4_2$, $4_3$), and is filled in gaps between conductors 1*a* within the wire, and is solidified to close these gaps, as shown in FIGS. 2 and 3. Thus, a closure portion 10 closing the gaps between the conductors 1*a* is formed and the intrusion of water toward the waterproof connector is prevented by the closure portion 10**.

The fusing treatment applied to the electrically-insulative covering **1*b*** is carried out by a known method, such as a high-frequency fusion and ultrasonic fusion.

As shown in FIG. 3, as a result of the fusing of the electrically-insulative covering **1*b*, the fused portion of this covering is thinned as at 1*b*', and is lowered in strength and electrical insulation. Therefore, it is preferred that a protective layer 9** be provided on this thinned portion.

In this embodiment, although the protective layer 9 comprises an electrically-insulative tape wound on the thinned portion, any other suitable means such as a heat shrinkable tube or sheet may be used. Another alternative is a synthetic resin tube (later described) bonded to the thinned portion by an adhesive.

The closure portion 10 formed by fusing the electrically-insulative covering **1*b* may be disposed at any position between the waterproof seal 3 and the waterproof connector $4_1$, but it is preferred that the closure portion 10** be positioned as close to the connector $4_1$ as possible.

Figure 6:
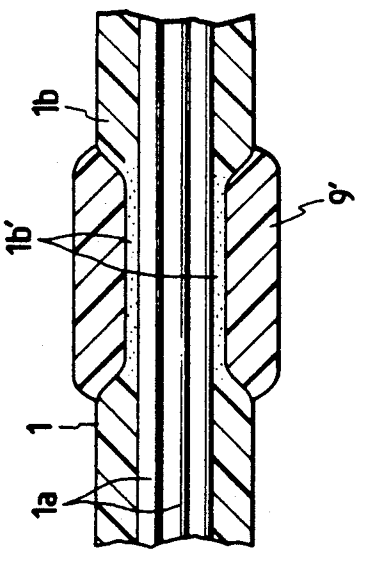
FIG. 6 is a cross-sectional view taken along the line VI—VI of FIG. 5.
Figure 5:
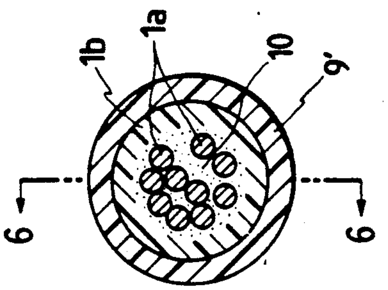
FIG. 5 is a cross-sectional view taken along the line V—V of FIG. 4.
Figure 4:
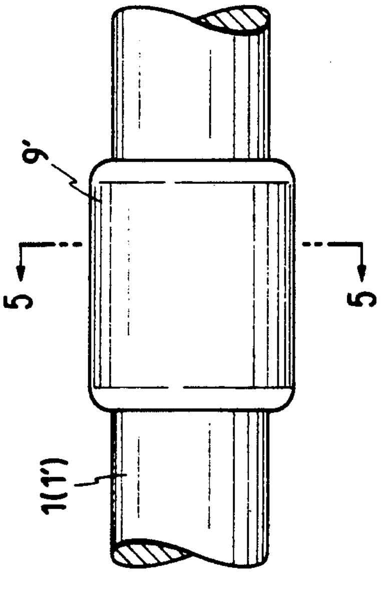
FIG. 4 is an enlarged plan view of an important portion of another embodiment of the invention.

FIGS. 4 to 6 show another embodiment of the invention in which the fusion or melting of the electrically-insulative covering **1*b* and the formation of the protective layer 9** are carried out at the same time.

More specifically, a soft or rigid synthetic resin tube 9' is fitted on the wire 1 (1'), and simultaneously with the fusion of the tube 9' to the wire, the electrically-insulative covering **1*b* is fused to form the above closure portion 10**.

With respect to the fusion, preferably, the material of the tube 9' and the fusing method should be changed depending on the kind of the electrically-insulative covering of the wire 1 (1'). Table 1 shows preferred examples of combinations. The tube 9' is not limited to a tubular shape, but may be of the semi-split type having slits or of the complete half-split type.

TABLE 1

| Material for insulative covering | Material for tube | Fusion method |
|---|---|---|
| Polyvinyl chloride | P.V.C | High-frequency fusion |
| Polyethylene | Polyethylene | Ultrasonic fusion |

As described above, in the present invention, by applying a fusion treatment to a portion of the electrically-insulative covering of the electrically insulatively-covered wire, the closure portion closing the gaps between the conductors within the wire so as to prevent the intrusion of water is formed. Therefore, even when water intrudes from the branch connecting portion, the penetration of the water into the waterproof connector is prevented, thereby preventing such troubles as the corrosion of the contact portion, an imperfect electrical conductivity, and a short-circuiting between the terminals, thus providing the wire harness of a high reliability.

What is claimed is:

1. A waterproof seal construction for a wire harness, comprising:

a plurality of wires each having an insulating covering and being connected together at a branch connecting portion, each of said wires including a plurality of wire conductors having gaps therebetween;

a waterproof connector connected to an end of at least one of said wires; and a closure portion disposed between said connecting portion and said water-proof connector for closing gaps between said conductors within at least one of said wires, wherein said closure portion is formed by fusing a portion of said covering of said at least one wire such that said covering portion is melted and fills said gaps between said conductors.

2. A waterproof seal construction for a wire harness claimed in claim 1, further comprising:

a protective layer provided on the outer periphery of said covering constituting said closure portion.

3. A waterproof seal construction for a wire harness as claimed in claim 2, wherein said closure portion is disposed closer to said waterproof connector than to said connecting portion.

4. A waterproof seal construction for a wire harness as claimed in claim 2, wherein said protective layer is formed by at least one of a heat shrinkable tube and a heat shrinkable sheet.

5. A waterproof seal construction for a wire harness as claimed in claim 2, wherein said protective layer is formed by synthetic resin tube bonded to said electrically-insulative covering by an adhesive.

6. A waterproof seal construction for a wire harness as claimed in claim 2, wherein said protective layer includes a synthetic resin tube and said closure portion is formed by simultaneously fusing said synthetic resin tube and said portion of said covering.

* * * * *